(12) United States Patent
Zhang et al.

(10) Patent No.: US 10,493,426 B2
(45) Date of Patent: Dec. 3, 2019

(54) GRAPHENE-METAL CHALCOGENIDE POROUS MATERIAL

(71) Applicant: Nanyang Technological University, Singapore (SG)

(72) Inventors: Hua Zhang, Singapore (SG); Hengchang Bi, Singapore (SG); Bo Chen, Singapore (SG); Qinglang Ma, Singapore (SG)

(73) Assignee: Nanyang Technological University, Singapore (SG)

( * ) Notice: Subject to any disclaimer, the term of this patent is extended or adjusted under 35 U.S.C. 154(b) by 432 days.

(21) Appl. No.: 15/112,355

(22) PCT Filed: Jan. 9, 2015

(86) PCT No.: PCT/SG2015/000005
§ 371 (c)(1),
(2) Date: Jul. 18, 2016

(87) PCT Pub. No.: WO2015/112088
PCT Pub. Date: Jul. 30, 2015

(65) Prior Publication Data
US 2016/0332136 A1     Nov. 17, 2016

Related U.S. Application Data

(60) Provisional application No. 61/931,999, filed on Jan. 27, 2014.

(51) Int. Cl.
*B01J 20/20*       (2006.01)
*C02F 1/28*        (2006.01)
(Continued)

(52) U.S. Cl.
CPC .............. *B01J 20/20* (2013.01); *B01J 20/02* (2013.01); *B01J 20/0262* (2013.01);
(Continued)

(58) Field of Classification Search
CPC .................................. B01J 20/20; C02F 1/28
See application file for complete search history.

(56) References Cited

U.S. PATENT DOCUMENTS 5,980,749 A  * 11/1999  Rendina ................ C02F 1/5236
                                                        210/633
2013/0202890 A1 *  8/2013  Kong ........................ H01B 1/02
                                                        428/402
(Continued)

FOREIGN PATENT DOCUMENTS

CN       103 449 424 A     12/2013
WO    WO 2013/123308 A1     8/2013
(Continued)

OTHER PUBLICATIONS

Chang Y. et al. Journal of Materials Chemistry, A. 14658-665. (Year: 2013) Provided By Applicant.*
(Continued)

*Primary Examiner* — Mark Eashoo
*Assistant Examiner* — M. Reza-Asdjodi
(74) *Attorney, Agent, or Firm* — Alston & Bird LLP

(57) ABSTRACT

A method of preparing a graphene-metal chalcogenide porous material is provided. The method includes providing a dispersion comprising graphene oxide; adding a metal precursor and a chalcogenide precursor to the dispersion to form a mixture; heating the mixture under hydrothermal conditions to form a gel; and freeze drying the gel to obtain the graphene-metal chalcogenide porous material. A graphene-metal chalcogenide porous material prepared by the method, and use of the material in water treatment, energy storage, fire proofing, batteries or supercapacitors are also provided.

19 Claims, 12 Drawing Sheets
(12 of 12 Drawing Sheet(s) Filed in Color)

(51) Int. Cl.
| | |
|---|---|
| *B01J 20/30* | (2006.01) |
| *C09K 21/06* | (2006.01) |
| *C01G 23/00* | (2006.01) |
| *C01G 35/00* | (2006.01) |
| *C01G 39/06* | (2006.01) |
| *C01G 41/00* | (2006.01) |
| *C01B 19/00* | (2006.01) |
| *B01J 20/28* | (2006.01) |
| *B01J 20/02* | (2006.01) |
| *B01J 20/06* | (2006.01) |
| *C01B 32/23* | (2017.01) |
| *C01B 32/182* | (2017.01) |
| *C01B 32/194* | (2017.01) |
| *C02F 101/20* | (2006.01) |
| *C02F 101/30* | (2006.01) |
| *C02F 101/32* | (2006.01) |

(52) U.S. Cl.
CPC ........... *B01J 20/0285* (2013.01); *B01J 20/06* (2013.01); *B01J 20/205* (2013.01); *B01J 20/28054* (2013.01); *B01J 20/3078* (2013.01); *B01J 20/3085* (2013.01); *C01B 19/007* (2013.01); *C01B 32/182* (2017.08); *C01B 32/194* (2017.08); *C01B 32/23* (2017.08); *C01G 23/007* (2013.01); *C01G 35/00* (2013.01); *C01G 39/06* (2013.01); *C01G 41/00* (2013.01); *C02F 1/281* (2013.01); *C02F 1/288* (2013.01); *C09K 21/06* (2013.01); *C01P 2002/85* (2013.01); *C01P 2004/03* (2013.01); *C02F 2101/20* (2013.01); *C02F 2101/30* (2013.01); *C02F 2101/308* (2013.01); *C02F 2101/32* (2013.01)

(56) References Cited

U.S. PATENT DOCUMENTS

| | | | | |
|---|---|---|---|---|
| 2014/0121425 | A1* | 5/2014 | Worsley | ................. B01J 27/051 585/240 |
| 2014/0371443 | A1* | 12/2014 | Seo | .......... C01B 19/00 536/92 |
| 2015/0175426 | A1 | 6/2015 | Jin et al. | |
| 2016/0332136 | A1* | 11/2016 | Zhang | ..................... C02F 1/281 |

FOREIGN PATENT DOCUMENTS

| | | | | |
|---|---|---|---|---|
| WO | WO-2013123308 A1 * | 8/2013 | | ............. C01B 19/00 |
| WO | WO-2014/021257 A1 | 2/2014 | | |

OTHER PUBLICATIONS

Hummers, Jr. et al. "Preparation of Graphitic Oxide." J. Am. Chem. Soc., 1958, 80, p. 1339.

Liao et al. "MoS2 Formed on Mesoporous Graphene as a highly active catalyst for hydrogen evaluation". Advanced Functional Materials, 2013, 23, pp. 5326-5333.

Zhang et al. "Mechanically strong and highly conductive graphene aerogel and its use as electrodes for electrochemical power sources". Journal of Materials Chemistry, 2011, 21, pp. 6494-6497.

Yang, S. et al. "Graphene-Based Nanosheets with a Sandwich Structure"., Angewandte Chemie International Edition, 2010, 49, pp. 4795-4799.

International Search Report and Written Opinion for International Patent Application No. PCT/SG2015/000005, dated Jul. 17, 2015, 8 pages.

Supplementary European Search Report for Application No. EP 15 74 1080 dated Sep. 25, 2017, 12 pages total.

Chang, K. et al., *L-Cysteine-Assisted Synthesis of Layered MoS$_2$/ Graphene Composites With Excellent Electrochemical Performances for Lithium Ion Batteries*, ACS Nano, vol. 5, No. 6 (2011) 4720-4728.

Chang, Y. et al., *Synthesis of 3D Nitrogen-Doped Graphene/Fe$_3$O$_4$ by a Metal Ion Induced Self-Assembly Process for High-Performance Li-ion Batteries*, Journal of Materials Chemistry A, 1 (2013) 14658-14665.

Yu, H. et al., *Three-Dimensional Hierarchical Architectures Constructed by Graphene/MoS$_2$ Nanoflake Arrays and Their Rapid Charging/Discharging Properties as Lithium-Ion Battery Anodes*, Chem. Eur. J, 19 (2013) 5818-5823.

\* cited by examiner

GRAPHENE-METAL CHALCOGENIDE POROUS MATERIAL

CROSS-REFERENCE TO RELATED APPLICATION

This application is a national phase entry of PCT/SG2015/000005, filed on 9 Jan. 2015, which claims the benefit of priority of U.S. provisional application No. 61/931,999 filed on 27 Jan. 2014, the content of which is incorporated herein by reference in its entirety for all purposes.

TECHNICAL FIELD

Various embodiments relate to a graphene-metal chalcogenide porous material.

BACKGROUND

Much effort has been devoted to removing pollutants such as organic liquids, synthetic dyes, and heavy metal from water in view of their detrimental impact on the environment and human health. State of the art methods to purify water include desalination, filtration, osmosis, adsorption, disinfection, and sedimentation. Amongst the various options, adsorption has many advantages, such as low costs, ease of operation, and fewer secondary products.

Adsorption refers to a process whereby pollutants are held in place on a surface of an adsorbent via physical forces such as capillary force and electrostatic force. Examples of adsorbent materials include polymer, activated carbon, silica, metal oxide, and natural sorbents such as cotton, rice husk, zeolites, and expanded perlite. After pollutants are adsorbed on the adsorbent, the physical forces holding the pollutants in place may be removed using methods such as heating and/or mechanically working the adsorbent. In so doing, the adsorbent may be regenerated and certain pollutants such as oil, toxic organics, and expensive metals may be recovered. Notwithstanding the above, problems associated with the adsorption process include poor efficiency of the adsorbent materials and/or introduction of other types of contamination during regeneration.

Carbon-based nanomaterials, in particular carbon aerogels, carbon nanotubes, graphene, and their composites, represent a promising type of adsorbent for water treatment, and have shown their great potential applications for removal of a range of synthetic dyes, heavy metals, oils, and organic solvents.

There exist two sets of adsorption mechanism for various types of pollutants. For example, electrostatic force is mainly responsible for adsorption of heavy metals and synthetic dyes, which requires that there are many charged sites on a surface of carbon-based adsorbent. On the other hand, capillary force is mainly responsible for sorption of oils and organic solvents, which require that the carbon-based adsorbents have high porosity. Unfortunately, these two types of pollutants generally coexist in wastewater, and it is difficult to find suitable carbon-based adsorbents that are able to adsorb both types of pollutants at the same time.

In view of the above, there exists a need for improved adsorbents that overcome or alleviate one or more of the above-mentioned problems.

SUMMARY

In a first aspect, a method of preparing a graphene-metal chalcogenide porous material is provided. The method comprises a) providing a dispersion comprising graphene oxide;
b) adding a metal precursor and a chalcogenide precursor to the dispersion to form a mixture;
c) heating the mixture under hydrothermal conditions to form a gel; and
d) freeze drying the gel to obtain the graphene-metal chalcogenide porous material.

In a second aspect, a graphene-metal chalcogenide porous material prepared by a method according to the first aspect is provided.

In a third aspect, use of a graphene-metal chalcogenide porous material prepared by a method according to the first aspect in water treatment, energy storage, fire proofing, batteries, or supercapacitors is provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will be better understood with reference to the detailed description when considered in conjunction with the non-limiting examples and the accompanying drawings, in which:

FIG. 1A is a SEM image of GMF1. FIG. 1B is a SEM image of GMF2. FIG. 1C is a SEM image of GMF3. FIG. 1D is a SEM image of GMF4. Insets are their corresponding high-magnification images. Scale bar in FIG. 1A to 1D represents 10 µm. Scale bar in the insets represents 1 µm.

FIG. 2A is a survey spectrum. FIG. 2B is C1s spectrum. FIG. 2C is Mo 3d spectrum. FIG. 2D is S 2p spectrum. The atomic percentage was determined to be 4.11% Mo and 10.46% S, which is consistent with theoretical values in $MoS_2$. The well defined spin-coupled Mo and S doublets, highlighted in FIG. 2C and FIG. 2D, are nearly the same binding energies as those of commercial $MoS_2$ nanoparticles.

FIG. 3A is a photograph showing adsorption of methyl orange using GMFs. FIG. 3B is a photograph showing adsorption of methylene blue. FIG. 3C is a photograph showing desorption of methyl orange. FIG. 3D is a photograph showing desorption of rhodamine B. FIG. 3E is a graph showing sorption capacity of GMFs for (i) methyl orange and (ii) methylene blue. FIG. 3F is a graph showing sorption capacity of GMFs for (i) $Pb^{2+}$ and (ii) $Cd^{2+}$.

FIG. 4A is graph showing sorption efficiency of GMF1, GMF2, GMF3 and GMF4. FIG. 4B shows photographs of dynamic sorption process of GMF1 for heptane stained with sudan red. FIG. 4C is a graph showing weight gain of GMF1 for various organic liquids. FIG. 4D is a graph showing recyclability of GMF1.

FIG. 5A is for acridine orange, FIG. 5B is for rose bengal, and FIG. 5C is for rhodamine B.

FIG. 6A is a graph of zeta potential measurements for GMF1 to GMF4;

and FIG. 6B are photographs of the dispersion of GMFs (GMF1 to GMF4) showing effect of surface potential.

DETAILED DESCRIPTION

Figure 1A:
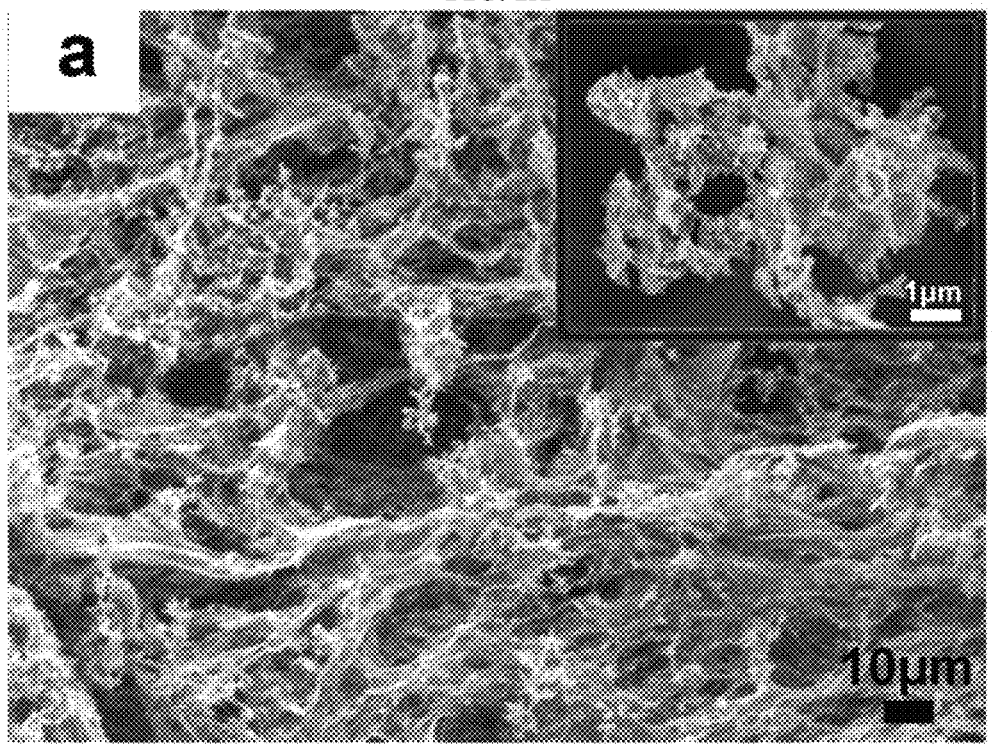
FIG. 1A to 1D are scanning electron microscopy (SEM) images depicting morphology of graphene/$MoS_2$ foams (GMFs).
Figure 1B:
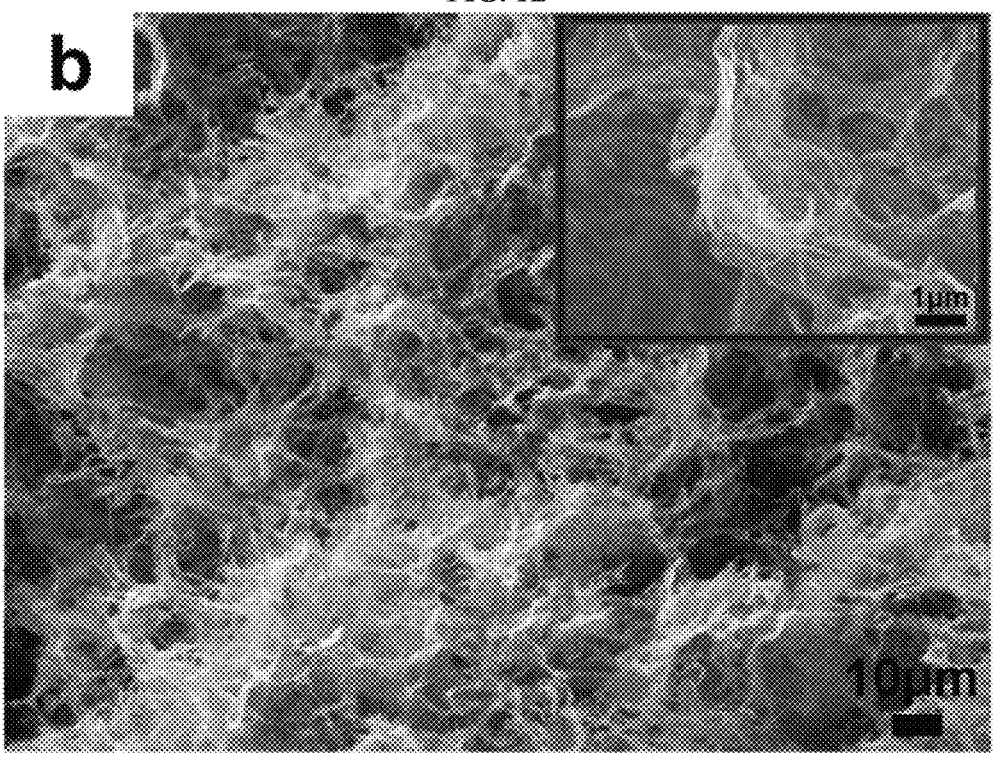
Figure 1C:
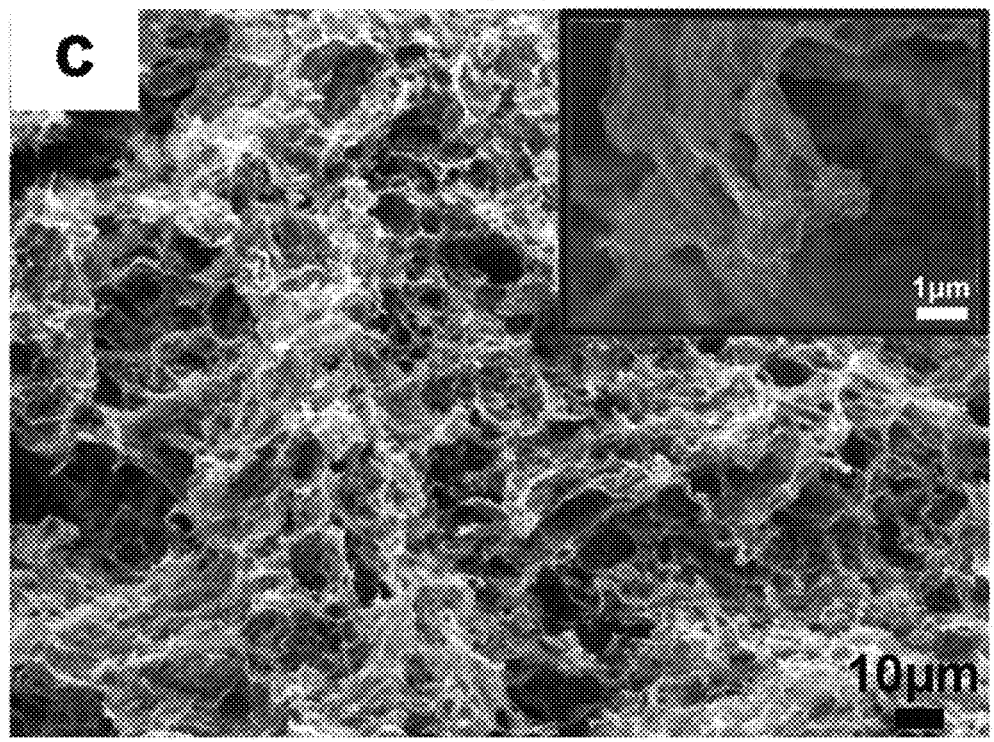
Figure 1D:
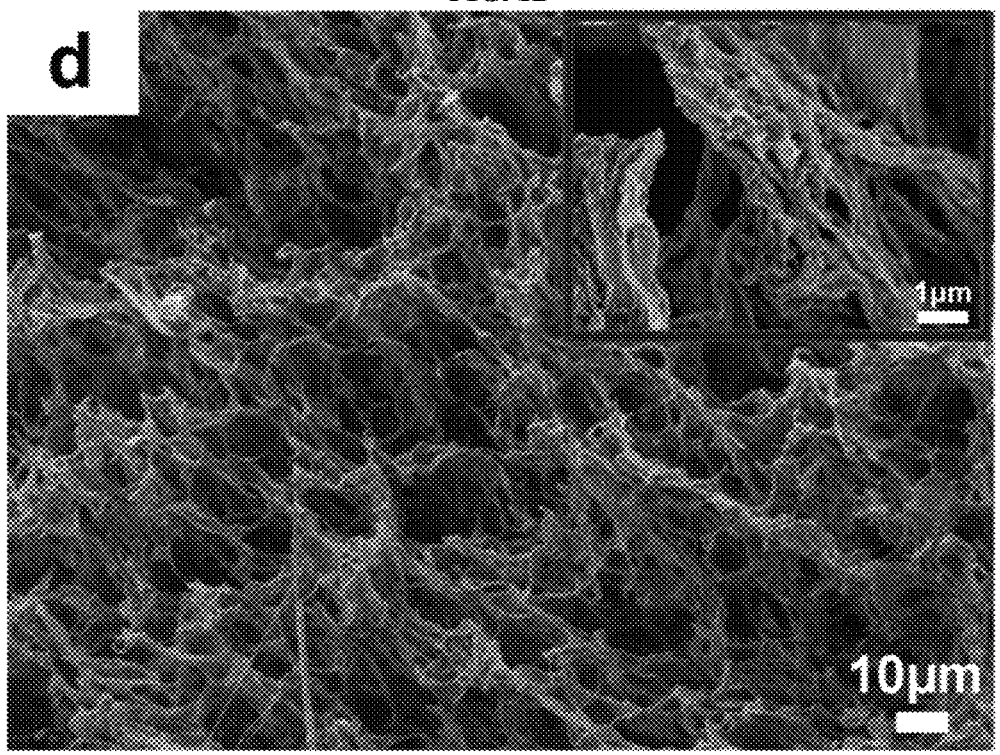
Figure 2A:
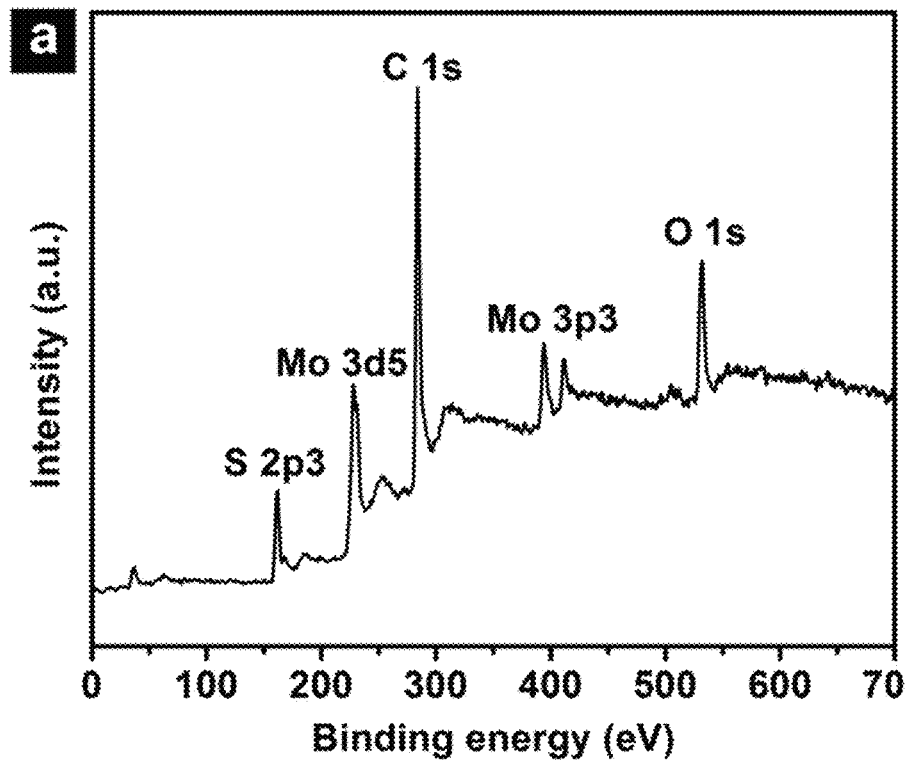
FIG. 2A to 2D are X-ray photoelectron spectroscopy (XPS) of graphene/$MoS_2$ composite.
Figure 2B:
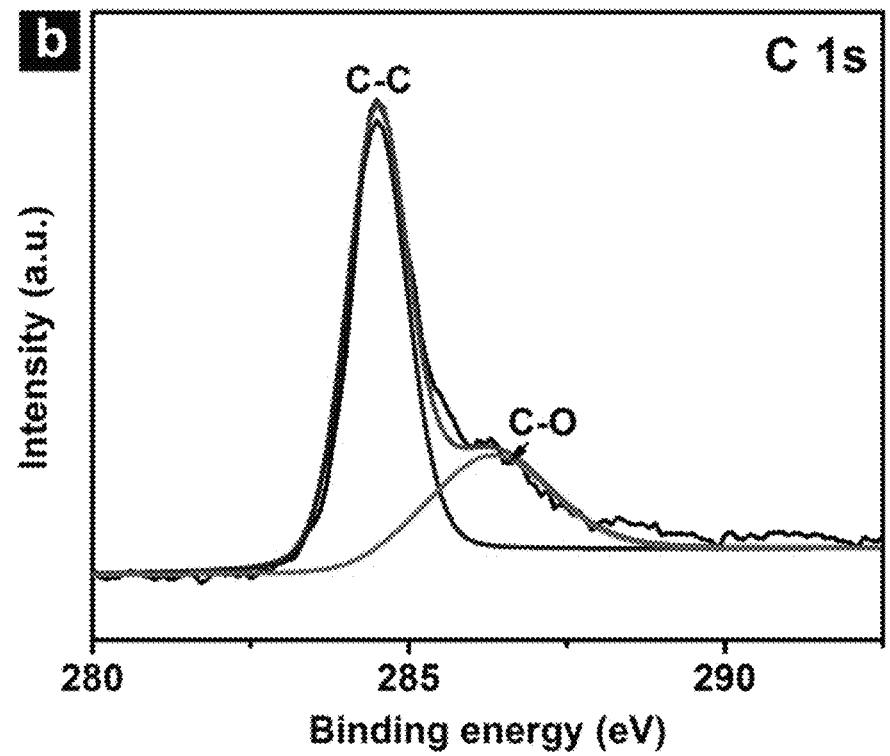
Figure 2C:
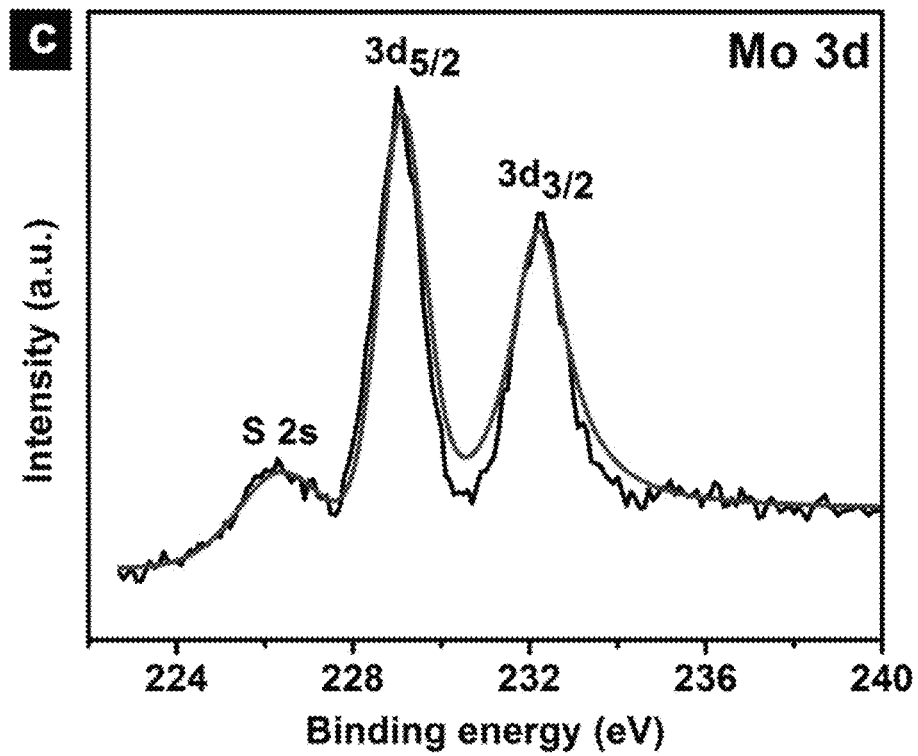
Figure 2D:
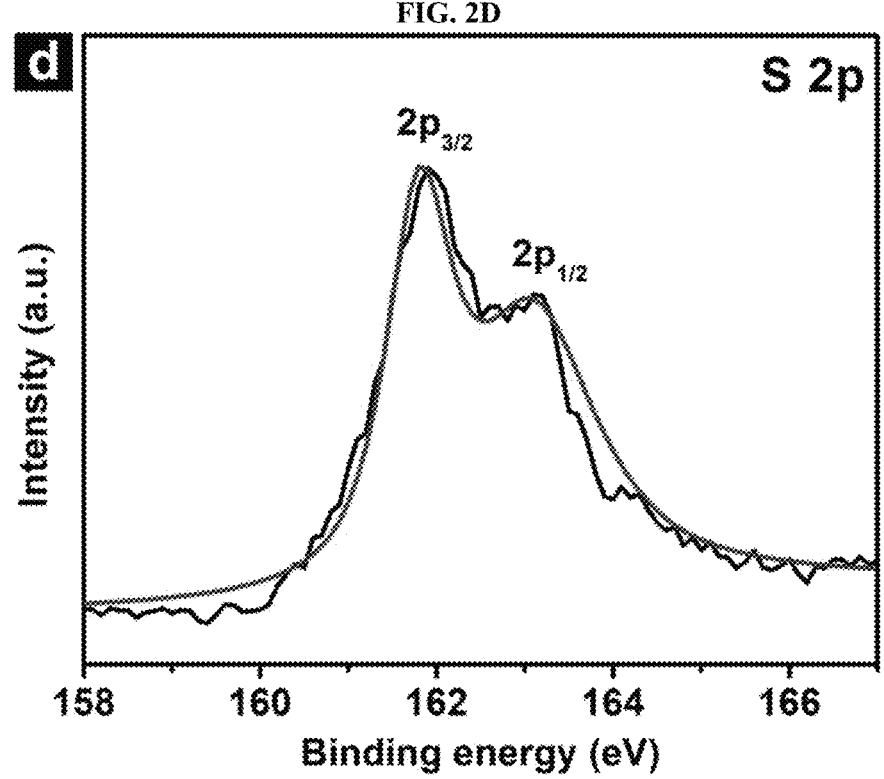

In a first aspect, a method of preparing a graphene-metal chalcogenide porous material is provided.

Advantageously, the graphene-metal chalcogenide porous material disclosed herein is fire resistant, and combustion may be carried out to recycle the material. The graphene-metal chalcogenide porous material is also versatile compared to other absorbents, as it is able to adsorb a wide range of pollutants, such as organic liquids, dyes, and heavy metals, due to presence of negatively charged metal chalcogenide on the material, to allow absorption of dyes and heavy metals in water treatment. This versatility is coupled with high adsorption capacity of the material. Methods disclosed herein are facile and low cost, which renders their ease in scaling up for commercial and industrial scale applications.

The method includes providing a dispersion comprising graphene oxide. Providing a dispersion comprising graphene oxide may include adding graphene oxide to an aqueous solution such as water to form the dispersion.

Graphene refers generally to a form of graphitic carbon, in which carbon atoms are covalently bonded to one another to form a two-dimensional sheet of bonded carbon atoms. The carbon atoms may be bonded to one another via sp2 bonds, and may form a 6-membered ring as a repeating unit, and may further include a 5-membered ring and/or a 7-membered ring. In its crystalline form, two or more sheets of graphene may be stacked together to form multiple stacked layers. Generally, the side ends of graphene are saturated with hydrogen atoms.

Graphene oxide refers to oxidized forms of graphene, and may include an oxygen-containing group such as a hydroxyl group, an epoxide group, a carboxyl group, and/or a ketone group. The term "graphene oxide" also includes reduced graphene oxide, which is graphene oxide which has been subjected to a reduction process, thereby partially or substantially reducing it.

Methods for making graphene oxide are known in the art and disclosed in, for example, Hummer, J. Am. Chem. Soc., 80:1339 (1958), which is incorporated herein by reference in its entirety. Generally, graphene oxide may first be dispersed in an aqueous suspension by sonicating graphene oxide in deionized water. Apart from water, the reaction mixture may also at least one organic solvent, such as alcohol, dimethylformamide, tetrahydrofuran, ethylene glycol, or N-methylpyrrolidone. Time for sonication may range from 0.5 hours to 24 hours. Concentration of graphene oxide in the reaction mixture may be 0.1 mg/cc or more, such as 1 mg/cc or more, 2 mg/cc or more, 5 mg/cc or more, or 10 mg/cc or more.

The method of preparing the graphene-metal chalcogenide porous material includes adding a metal precursor and a chalcogenide precursor to the dispersion comprising graphene oxide to form a mixture. The metal precursor and the chalcogenide precursor may be added at the same time, or in a sequential manner, to the dispersion.

The metal precursor may be a precursor of a transition metal. The term "transition metal" as used herein may refer to a metal in Group 3 to 12 of the Periodic Table of Elements, such as titanium (Ti), vanadium (V), niobium (Nb), tantalum (Ta), chromium (Cr), molybdenum (Mo), tungsten (W), manganese (Mn), iron (Fe), ruthenium (Ru), osmium (Os), iridium (Ir), nickel (Ni), copper (Cu), technetium (Tc), rhenium (Re), cobalt (Co), rhodium (Rh), iridium (Ir), palladium (Pd), platinum (Pt), silver (Ag), gold (Au), a lanthanide such as europium (Eu), gadolinium (Gd), lanthanum (La), ytterbium (Yb), and erbium (Er), or a post-transition metal such as gallium (Ga), and indium (In).

In various embodiments, the metal precursor is a precursor of a metal selected from Group 4 to Group 6 of the Periodic Table of Elements. For example, the metal precursor may be a precursor of titanium (Ti), zirconium (Zr), hafnium (Hf), vanadium (V), niobium (Nb), tantalum (Ta), chromium (Cr), molybdenum (Mo), and/or tungsten (W). In some embodiments, the metal precursor is a precursor of a metal selected from the group consisting of Mo, Ta, Ti, W, and combinations thereof.

The metal precursor may be selected from the group consisting of a molybdate, a tantalate, a titanate, a tungstate, and combinations thereof.

For example, the metal precursor may be a molybdate. In various embodiments, the metal precursor is selected from the group consisting of an alkali metal molybdate salt and ammonium molybdate. In some embodiments, the metal precursor comprises or consists of an alkali metal molybdate salt. Examples of alkali metal include lithium, sodium, potassium, rubidium, and francium. Accordingly, the alkali metal molybdate salt may be lithium molybdate, sodium molybdate, potassium molybdate, rubidium molybdate, and/or francium molybdate. In specific embodiments, the metal precursor comprises or consists of sodium molybdate dehydrate.

In addition to the metal precursor, a chalcogenide precursor is added to the dispersion.

As used herein, the term "chalcogenide" refers to chemical elements in Group 16 of the Periodic Table of Elements, and more particularly to sulfur, selenium, and tellurium. The chalcogenide precursor may be selected from the group consisting of a thioamide, a selenoamide, a tellurium amide, and combinations thereof. In various embodiments, the chalcogenide precursor comprises or consists of thioacetamide.

The mixture comprising graphene oxide, metal precursor, and chalcogenide precursor is heated under hydrothermal conditions to form a gel. By heating the metal precursor and the chalcogenide precursor under hydrothermal conditions, the metal precursor may react with the chalcogenide precursor to form metal chalcogenide. The term "metal chalcogenide" refers to a compound containing a metal and a chalcogenide. Hence, the metal precursor and the chalcogenide precursor functions as a source of the metal and chalcogen, respectively, of the metal chalcogenide material. The metal chalcogenide may be in the form of nanoparticles, and is present along with graphene in the gel.

Different metal chalcogenides may be formed depending on the metal precursor and chalcogenide precursor present. For example, the metal chalcogenide may be a transition metal chalcogenide. In various embodiments, the metal chalcogenide comprises or consists of a metal dichalcogenide. In some embodiments, the metal chalcogenide is selected from the group consisting of $MoS_2$, $MoSe_2$, $TaS_2$, $TiS_2$, $WS_2$, and combinations thereof.

As used herein, the term "hydrothermal" refers to treatment conditions of a reagent in a sealed system such as a closed vessel or an autoclave, whereby temperatures in the system are raised to a temperature above normal boiling point of the reagent at a pressure that is equal to or greater than the pressure required to prevent boiling of the reagent.

The temperature at which the mixture comprising the graphene oxide, the metal precursor, and the chalcogenide precursor is heated may depend on the type of metal precursor and chalcogenide precursor present.

In various embodiments, heating the mixture under hydrothermal conditions comprises heating the mixture in a closed vessel at a temperature in the range of about 150° C. to about 250° C. For example, heating the mixture in a closed vessel may be carried out at a temperature in the range of about 180° C. to about 250° C., about 200° C. to about 250° C., about 220° C. to about 250° C., about 150° C. to about 220° C., about 150° C. to about 200° C., about 150° C. to about 180° C., about 180° C. to about 220° C., about 200° C. to about 220° C., or about 180° C. to about 200° C.

Heating the mixture under hydrothermal conditions may be carried out for any suitable length of time that is sufficient to form the gel. In various embodiments, heating the mixture under hydrothermal conditions comprises heating the mixture in a closed vessel for a time period in the range of about 12 h to about 48 h, such as about 18 h to about 48 h, about 24 h to about 48 h, about 36 h to about 48 h, about 12 h to about 36 h, about 12 h to about 24 h, about 12 h to about 18 h, about 18 h to about 36 h, about 18 h to about 24 h, or about 24 h to about 36 h.

The method includes freeze drying the gel to obtain the graphene-metal chalcogenide porous material.

Various embodiments of the freeze drying technique disclosed herein are based upon principle of sublimation of water to form a graphene-metal chalcogenide porous material, while binding the metal chalcogenide to the graphene.

The freeze drying may be carried out in a partial vacuum or a vacuum. During freeze drying, simultaneous action of vacuum and temperature facilitates a tight packing order of the gel. At the same time, water present in the gel may sublime. In so doing, water may be removed from the gel to leave a porous material containing the graphene and the metal chalcogenide. This also allows physical binding of the metal chalcogenide to graphene to form a network structure.

Advantageously, by controlling pressure and temperature of the hydrothermal process, water may be evaporated or sublimed from the gel to form the graphene-metal chalcogenide porous material. This renders the process green as hazardous and toxic solvents are not used.

Freeze drying the mixture may be carried out at any suitable temperature which is sufficient to sublime water that is present in the gel. In various embodiments, freeze drying the gel is carried out at a temperature in the range of about −50° C. to about 0° C., such as about −30° C. to about 0° C., about −10° C. to about 0° C., about −50° C. to about −10° C., about −50° C. to about −20° C., about −50° C. to about −30° C., about −40° C. to about −10° C., about −30° C. to about −20° C.

Freeze drying the gel may be carried out for a time period in the range of about 24 h to about 56 h. For example, freeze drying the gel may be carried out for a time period in the range of about 36 h to about 56 h, such as about 48 h to about 56 h, about 24 h to about 48 h, about 24 h to about 36 h, about 36 h to about 48 h, or about 30 h to about 50 h.

Following the freeze drying process, a graphene-metal chalcogenide porous material may be formed.

Weight ratio of metal chalcogenide to graphene in the graphene-metal chalcogenide material may be in the range of about 700 wt. % to about 900 wt. %. For example, weight ratio of metal chalcogenide to graphene in the graphene-metal chalcogenide material may be in the range of about 750 wt. % to about 900 wt. %, about 800 wt. % to about 900 wt. %, about 850 wt. % to about 900 wt. %, about 700 wt. % to about 850 wt. %, about 700 wt. % to about 800 wt. %, about 700 wt. % to about 750 wt. %, about 750 wt. % to about 850 wt. %, about 850 wt. % to about 870 wt. %. In specific embodiments, weight ratio of metal chalcogenide to graphene in the graphene-metal chalcogenide material is about 860 wt. %.

Adding the metal precursor and the chalcogenide precursor to the dispersion to form a mixture may include adding at least one of metal particles or metal oxide particles to the dispersion. Addition of the metal and/or metal oxide particles may be used to synthesis graphene-metal oxide nanocomposite for use in fabrication of supercapacitors and/or lithium ion batteries.

In various embodiments, the metal particles are selected from the group consisting of gold particles, silver particles, copper particles, and combinations thereof.

In various embodiments, the metal oxide particles are selected from the group consisting of nickel oxide particles, manganese oxide particles, iron oxide particles, zinc oxide particles, and combinations thereof.

Porosity of the graphene-metal chalcogenide porous material may be in the range of about 99.5% to about 99.9%, such as about 99.5%, about 99.6%, about 99.7%, about 99.8%, or about 99.9%.

Various embodiments refer in a second aspect to a graphene-metal chalcogenide porous material prepared by a method according to the first aspect. Examples of metal chalcogenide that may be present have already been discussed above.

Various embodiments refer in a third aspect to use of a graphene-metal chalcogenide porous material prepared by a method according to the first aspect in water treatment, energy storage, fire proofing, batteries, or supercapacitors.

In specific embodiments, a graphene-metal chalcogenide porous material prepared by a method according to the first aspect is used in water treatment. As disclosed herein, graphene-metal chalcogenide porous material prepared by a method according to embodiments have high porosity and large zeta potential values of −40 mV and below.

The term "zeta potential" as used herein refers to a measure of electrokinetic potential of the metal chalcogenide, and may be represented by a charge of the metal chalcogenide's surface. The negative charges on metal chalcogenide promote electrostatic attraction of positively charged contaminants with itself, in this case heavy metal ions and some organic dyes. As such, the positively charged contaminants are attracted or pulled towards metal chalcogenide where the contaminants may be adsorbed onto the graphene-metal chalcogenide porous material, such that contaminated water is purified.

The porous materials disclosed herein have shown good adsorption performance for heavy metals, synthetic dyes, oils and organic solvents.

For example, absorption capacity of the porous material disclosed herein may reach up to 285 times of the weight of the porous material for oils and organic solvents. Moreover, after five cycles, the porous material still possesses a high adsorption capacity. For heavy metals, the absorption capacity achieved was 285 mg/g and 210 mg/g for $Pb^{2+}$ and $Cd^{2+}$ respectively. For dyes, the absorption capacity achieved was 104 mg/g and 141 mg/g for methyl orange and methylene blue respectively.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXAMPLES

Various embodiments relate to synthesis of a novel foam composed of graphene and $MoS_2$, referred to as GMFs. The GMFs may be used for applications in energy storage devices, water splitting, and environmental protection.

To demonstrate application areas for the GMFs, the GMFs were used as sorbents for removal of pollutants such as oils, organic solvents, dyes, and heavy metals, which shows excellent adsorption capacity. GMFs are not only low cost, but also possess high adsorption capacity of 285 times the weight of the pristine GMFs. Moreover, GMFs have an excellent recyclability.

For the first time, synthesis of the novel GMFs is reported. The GMFs may be easily produced by a hydrothermal method and freeze drying. Methods disclosed herein are able to produce large quantities of the GMFs and cause very little pollution, all of which are important for practical applications. In addition, this method is very low cost and facile, which is beneficial for commercial application.

This method is a general method which may be used to fabricate foams composed of graphene with 2D materials such as $MoSe_2$, $TaS_2$, $TiS_2$, and $WS_2$.

Usage of the GMFs as sorbents for pollutants such as organic liquids, dyes and heavy metals is demonstrated for the first time, since the prepared $MoS_2$ is negative charged and enables absorption of dyes and heavy metals in water treatment.

The GMFs may be further modified for the other applications such as energy storage device, and water splitting.

The method offers great opportunities for commercialization of sorbents. Results have demonstrated high adsorption capacity for oils, organic solvents, dyes and heavy metals, and excellent recyclability.

Example 1

Preparation of Graphene Oxide (GO)

GO was prepared by oxidizing expandable graphite powders based on a modified Hummers method. Graphite flakes (2 g; purity greater than 99.7%) and sodium nitrate (1 g) were mixed with sulfuric acid (46 mL, 98 wt. %) in an ice bath. Potassium permanganate (6 g) was added to the mixture very slowly to prevent the temperature from exceeding 20° C. The reaction was then maintained at 35° C.±1° C. for 8 h, during which the chemical gas was released. Deionized water (92 mL) was gradually added, resulting in violent effervescence. Temperature of the water bath was increased to 98° C. and maintained for 15 min to increase degree of oxidation of the GO product. The bright-yellow suspension was diluted with deionized water (280 mL) and further treated with $H_2O_2$ (30%, 6 mL). Finally, the mixture was separated via centrifugation and washed seven times with 5% hydrochloric acid solution until no sulfate ions could be detected by $BaCl_2$. The product was then washed seven times with distilled water to remove chloride ions and dried overnight in an oven at 60° C.

Example 2

Fabrication of GMF

GO was dispersed in distilled water followed by sonication to form a uniform colloidal dispersion of GO with concentration of 2.5 mg $mL^{-1}$.

For GMF1, 15 mg of sodium molybdate dehydrate (SMD) and 30 mg of thioacetamide were put in 20 mL of GO dispersion. The mixture was then transferred to a sealed reactor and heated at 200° C. for 24 h. The reactor was cooled down naturally in RT. The as-prepared wet GMF gel was then taken out from the reactor and dipped into distilled water for 24 h to remove residual SMD and thioacetamide, and subsequently freeze-dried for 48 h to obtain GMF1.

For GMF2, the steps used were the same as that used for GMF1, except that 30 mg of SMD and 60 mg of thioacetamide were put in 20 mL of GO dispersion.

For GMF3, the steps used were the same as that used for GMF1, except that 45 mg of SMD and 90 mg of thioacetamide were put in 20 mL of GO dispersion.

For GMF4, the steps used were the same as that used for GMF1, except that 60 mg of SMD and 120 mg of thioacetamide were put in 20 mL of GO dispersion.

Example 3

Results and Discussion

Figure 5A:
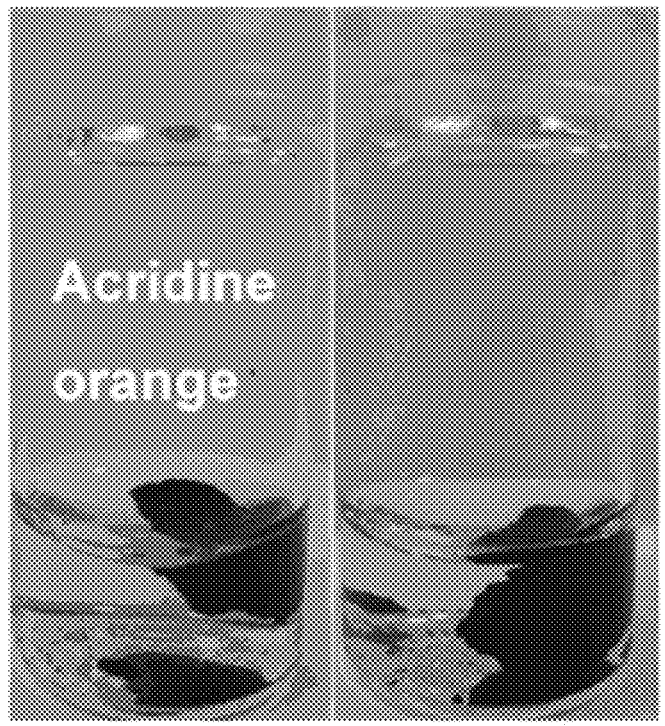
FIG. 5A to 5C show photographs showing adsorption of additional dyes, where
Figure 5B:
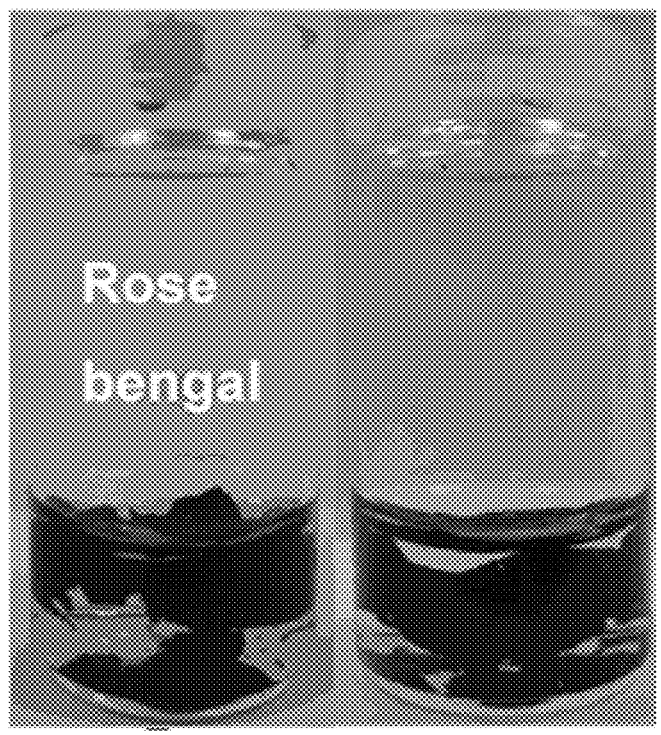
Figure 5C:
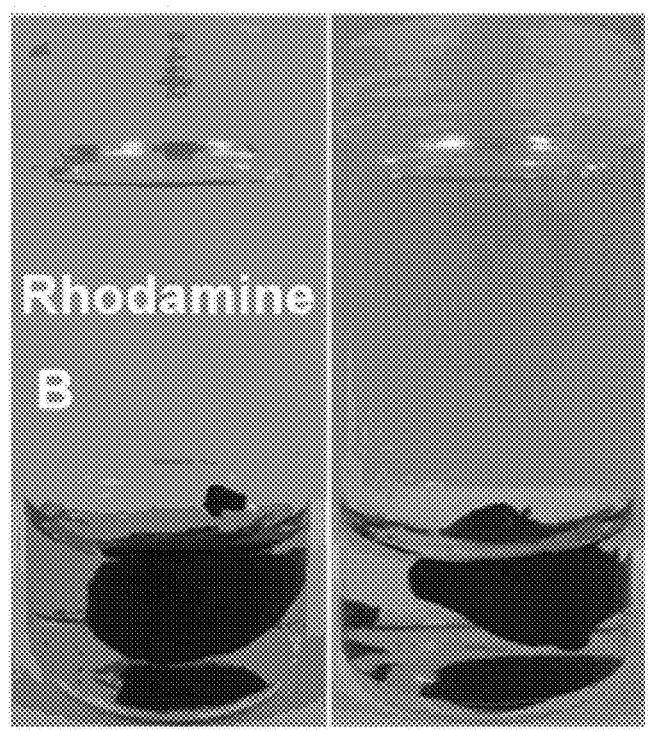

FIG. 3A to 3F show adsorption and desorption of different dyes and heavy metals in GMFs. It may be clearly seen that after putting a GMF into methyl orange water solution for 1 h, the yellow solution turned colorless (FIG. 3A), indicating the removal of methyl orange. In addition, when a GMF was put into methylene blue water solution for 2 h, the blue solution became colorless, indicating the removal of methylene blue. Other dyes such as rose bengal, rhodamine B, acridine orange were adsorbed as shown in FIG. 5A to 5C, all of which demonstrated that GMFs are suitable for adsorption of a wide range of dyes and have good adsorption performance.

Besides, ethanol may be used to desorb the dyes that have been adsorbed by GMFs. When a GMF adsorbed with methyl orange was put into ethanol, the colorless ethanol solution became light yellow gradually (FIG. 3C) after about 8 min, indicating that methyl orange was gradually released from the GMF.

Similarly, the colorless ethanol solution turned pink when a GMF adsorbed with rhodamine B was put into it for 8 min (FIG. 3D), which indicated that rhodamine B was released from the GMF. Both methyl orange and rhodamine B may be released from GMFs completely after repeated washing with ethanol several times.

Figure 3A:
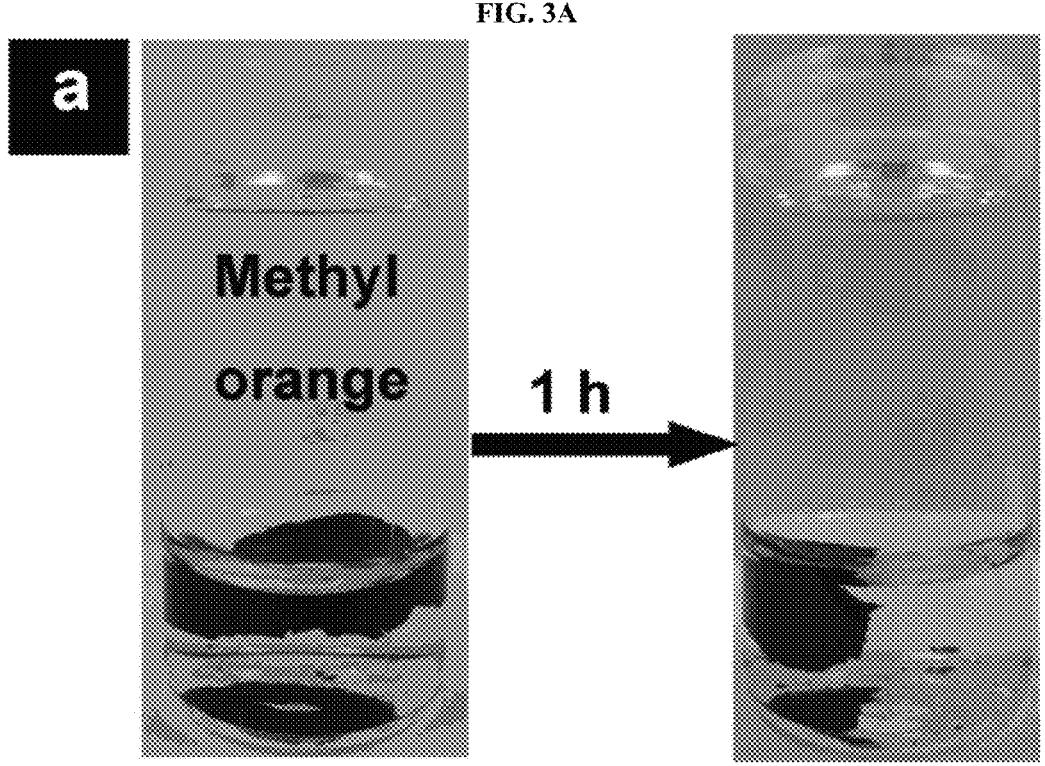
FIG. 3A to 3F depict adsorption and desorption of different dyes and heavy metals in GMFs.
Figure 3B:
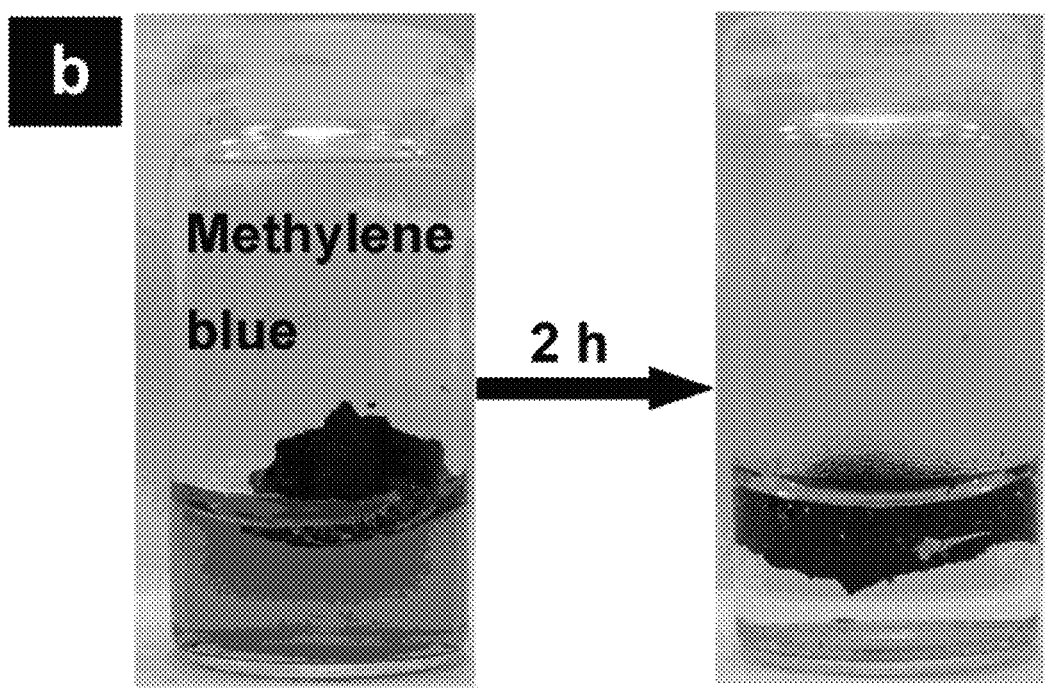
Figure 3C:
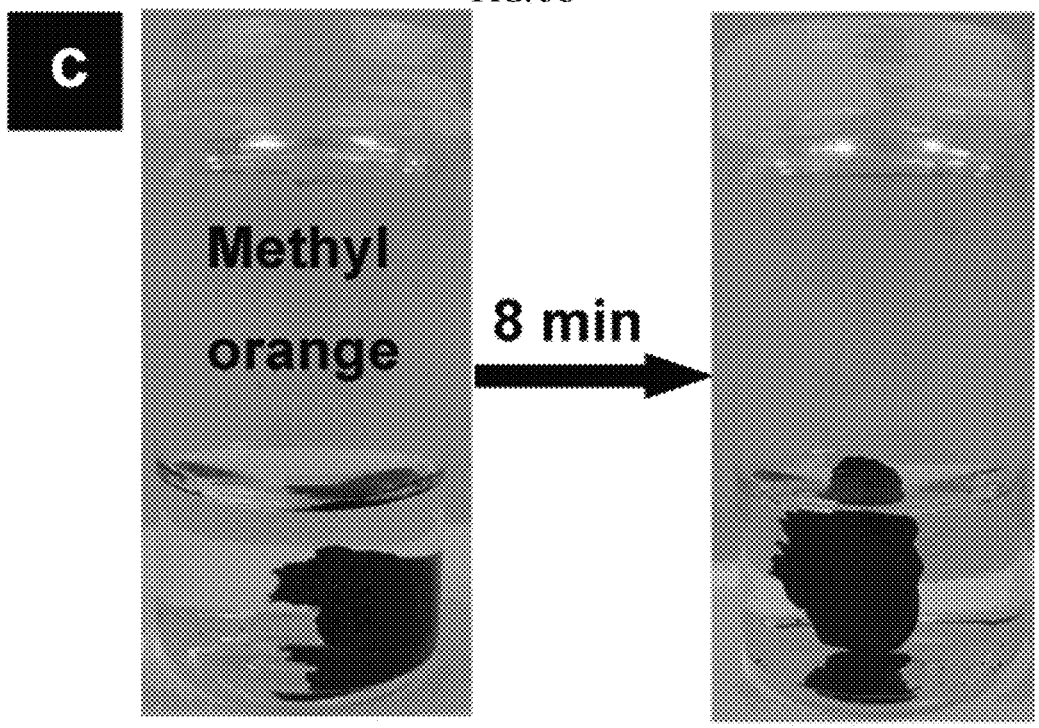
Figure 3D:
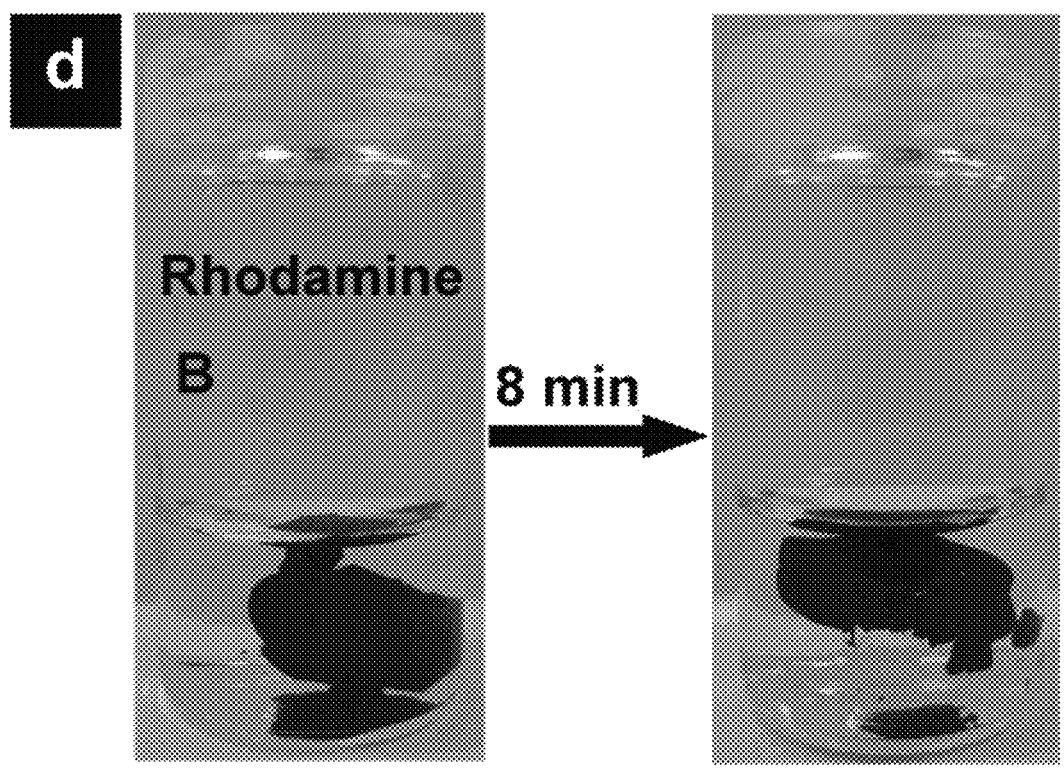
Figure 3E:
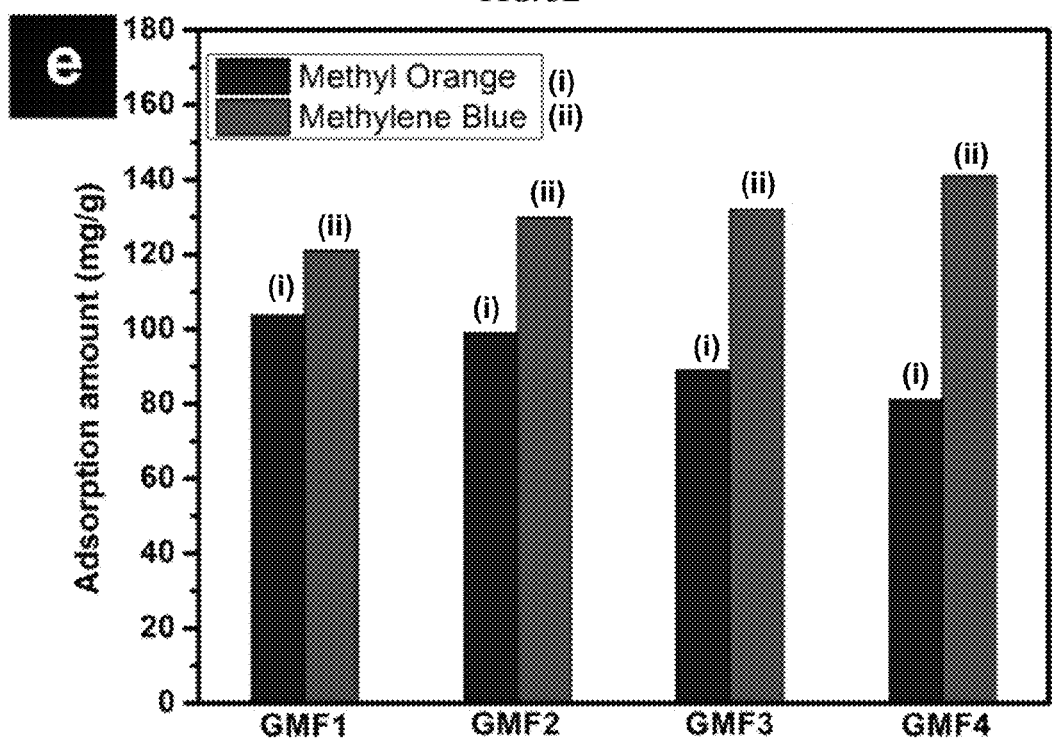

In order to evaluate the adsorption performance of GMFs better, adsorption capacity defined as the weight of adsorbed substance per unit weight of dry GMFs was adopted. FIG. 3E shows the adsorption capacity of GMFs for methyl orange and methylene blue, respectively. The adsorption capacity for GMFs was measured after the GMFs being put into dye solutions for 24 h, because the adsorption equilibrium may be reached and the highest adsorption amount may be achieved.

From the results obtained, it was clearly found that for methyl orange, the adsorption capacity is 104, 99, 89, and 81 mg g$^{-1}$ for GMF1, GMF2, GMF3, and GMF4, respectively.

For methylene blue, the adsorption capacity for GMF1, GMF2, GMF3, and GMF4 corresponded to 121, 130, 132, and 141 mg g$^{-1}$, respectively.

Figure 3F:
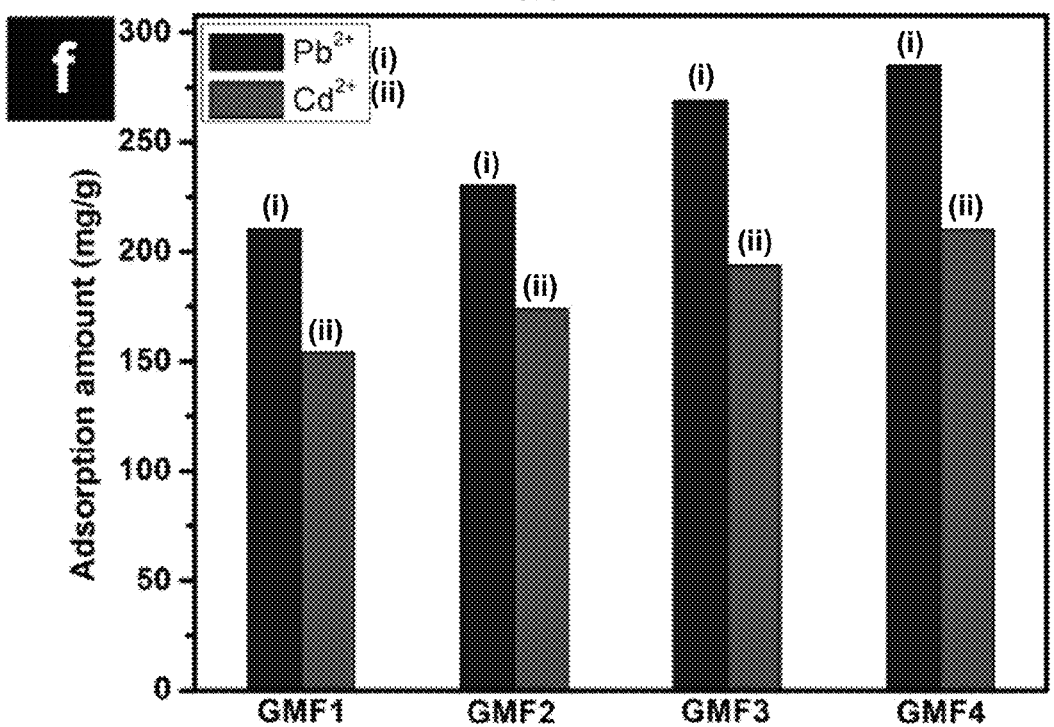

Heavy metals are another kind of water contaminates. FIG. 3F represents adsorption capacity of GMFs for heavy metal ions such as $Pb^{2+}$, $Cd^{2+}$. It is clearly seen that, for $Pb^{2+}$, the adsorption capacity is 210, 230, 269, and 285 mg g$^{-1}$ for GMF1, GMF2, GMF3, and GMF4, respectively; the corresponding capacity for $Cd^{2+}$ for GMF1, GMF2, GMF3, and GMF4 is 154, 174, 194, and 210 mg g$^{-1}$, respectively.

GMFs are hydrophobic and exhibit super wetting behavior for organic solvents and oils. These materials also have an open porous network (FIG. 1A to 1D). These properties render GMFs as excellent candidates for selective superabsorbance to address environmental and ecological problems brought about by crude oil, petroleum products, and toxic organic solvents.

To determine the sorption ability of GMFs quantitatively, sorption efficiency of the GMF samples was investigated. Sorption efficiency may be determined by weight gain (i.e., wt. %), which is defined as the weight of absorbed oil or solvent per unit weight of dry GMF.

Figure 4A:
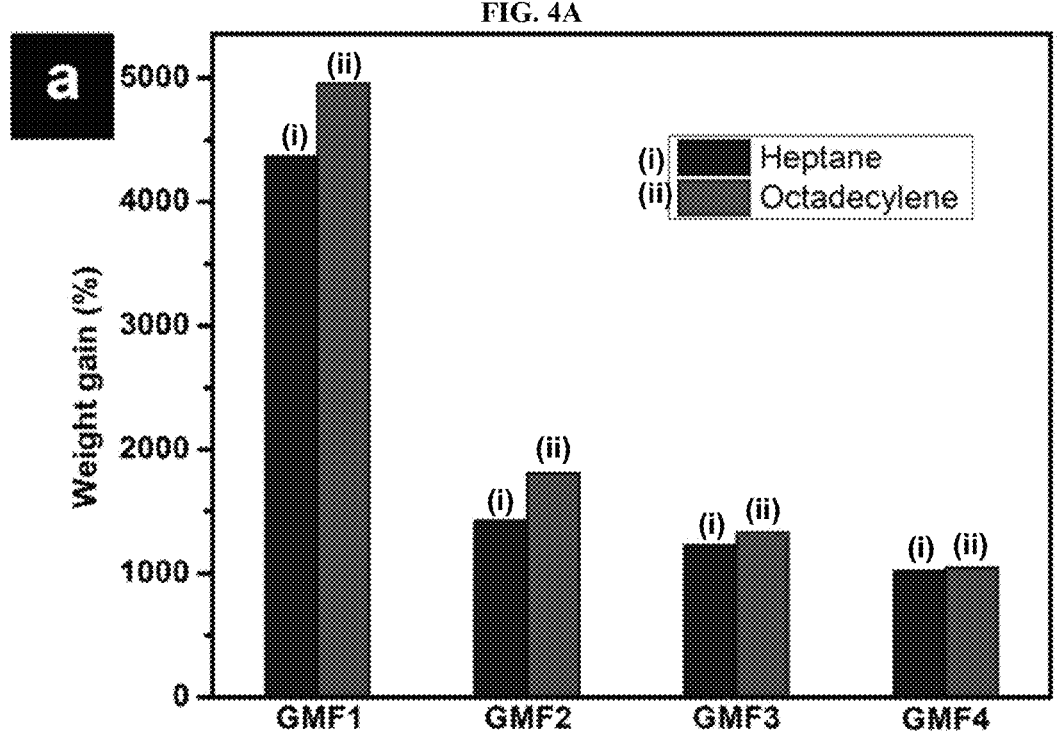
FIG. 4A to 4D depict absorption and recyclability of organic liquids by graphene/$MoS_2$ composite disclosed herein.
Figure 4B:
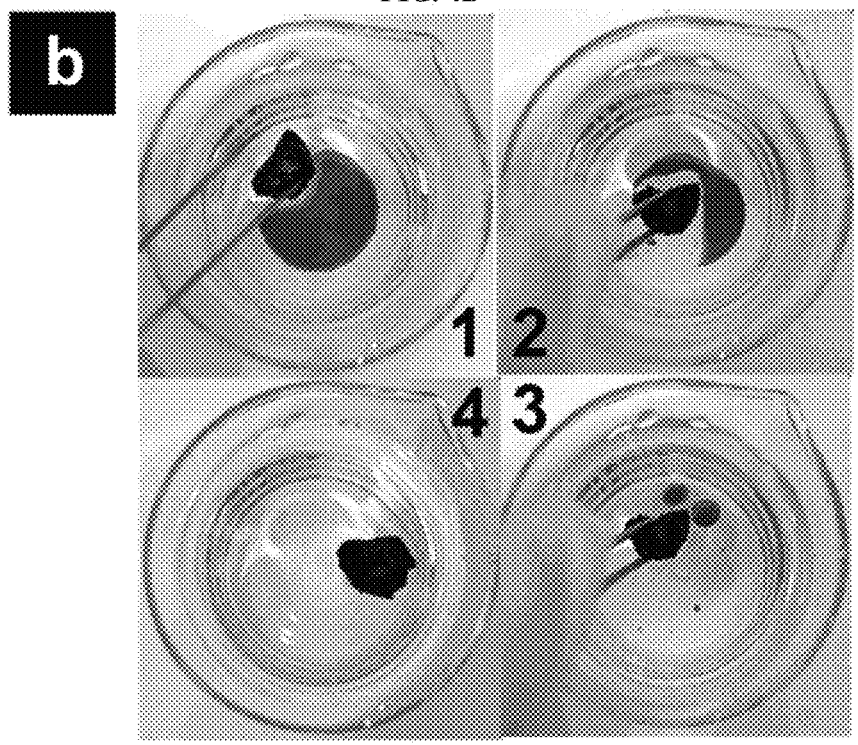

The sorption efficiencies of GMF1, GMF2, GMF3 and GMF4 are shown in FIG. 4A. The absorption capacities of GMF1 (43.7× and 49.6× for heptane and octadecylene, respectively) were significantly higher than those of GMF2 (14.3× and 18.1× for heptane and octadecylene, respectively) or GMF3 (12.3× and 13.3× for heptane and octadecylene, respectively) or GMG4 (10.2× and 10.5× for heptane and octadecylene, respectively). The difference in sorption capacities of GMFs may be attributed to their surface area and internal structures, especially the latter. The strong sorption capability of GMF1 was demonstrated in FIG. 4B qualitatively. When the GMF1 was brought into contact with a heptane layer (stained with Sudan red 5B) on a water surface, it absorbed the heptane completely and rapidly. Because of its low density and hydrophobicity, the GMF1 floated on the water surface after sorption of the heptane, indicating its potential use for facile removal of oil spillage and chemical leakage and the ease for recycling.

Figure 4C:
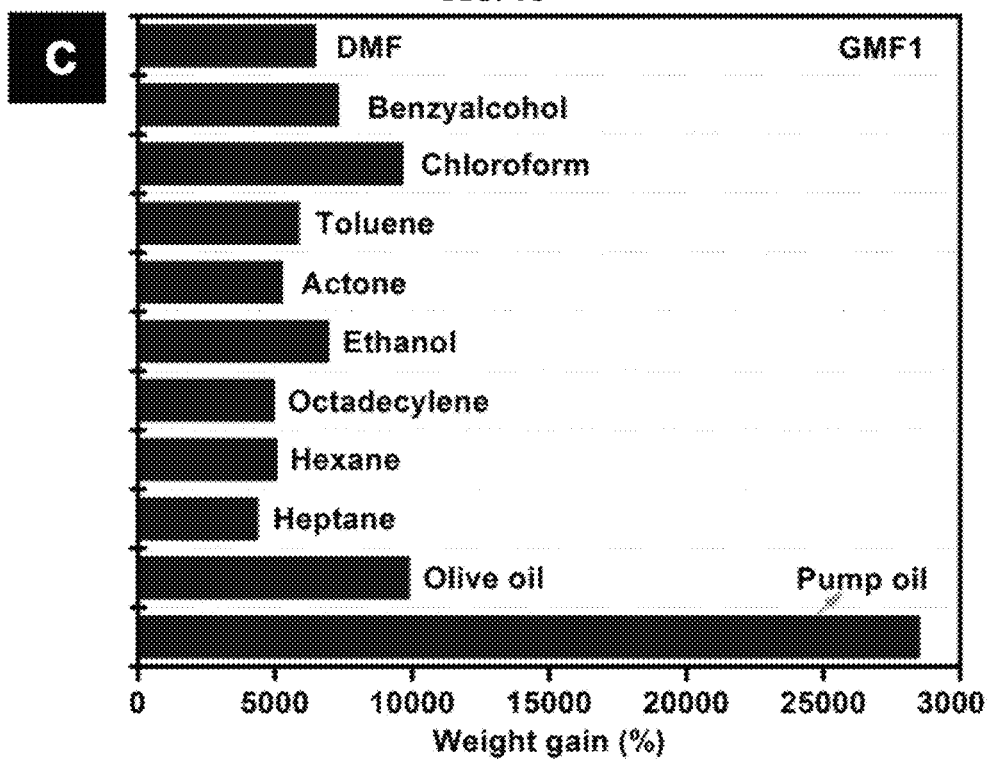

In order to evaluate its sorption capacity comprehensively, various classes of organic liquids were evaluated for GMF1, including pump oil, chloroform, hexane, toluene, etc. GMF1 showed excellent sorption in all of the tested liquids (FIG. 4C). In general, GMF1 could absorb liquids amounting to 43× to 285× its own weight. Importantly, the obtained GMF1 has showed much higher sorption capacity than many previously reported sorbents, such as nanowire membrane (4 to 20 times), polymers (5 to 25 times), exfoliated graphite (60 to 90 times), graphene/a-FeOOH composite (10 to 30 times), vegetable fiber (1 to 100 times), spongy graphene (20 to 86 times), carbonaceous nanofiber aerogel (40 to 115 times) and CNT sponge doped with boron (25 to 125 times). Although the sorption capacity of GMF1 is still lower than that of ultra-flyweight aerogels (215 to 913 times), CNF aerogels (106 to 312 times) and nitrogen doped graphene foam (200 to 600 times), the GMF1 may absorb dyes and heavy metals (FIG. 3A to 3F) which is impossible for the above three adsorbents. Therefore, the GMF may remove water contaminations more comprehensively than other sorbents.

Pollution control and environmental protection efforts require that pollutants are not only absorbed and prevented from further harming the environment but also properly recycled and reused because pollutants are either precious raw materials or toxic.

Figure 4D:
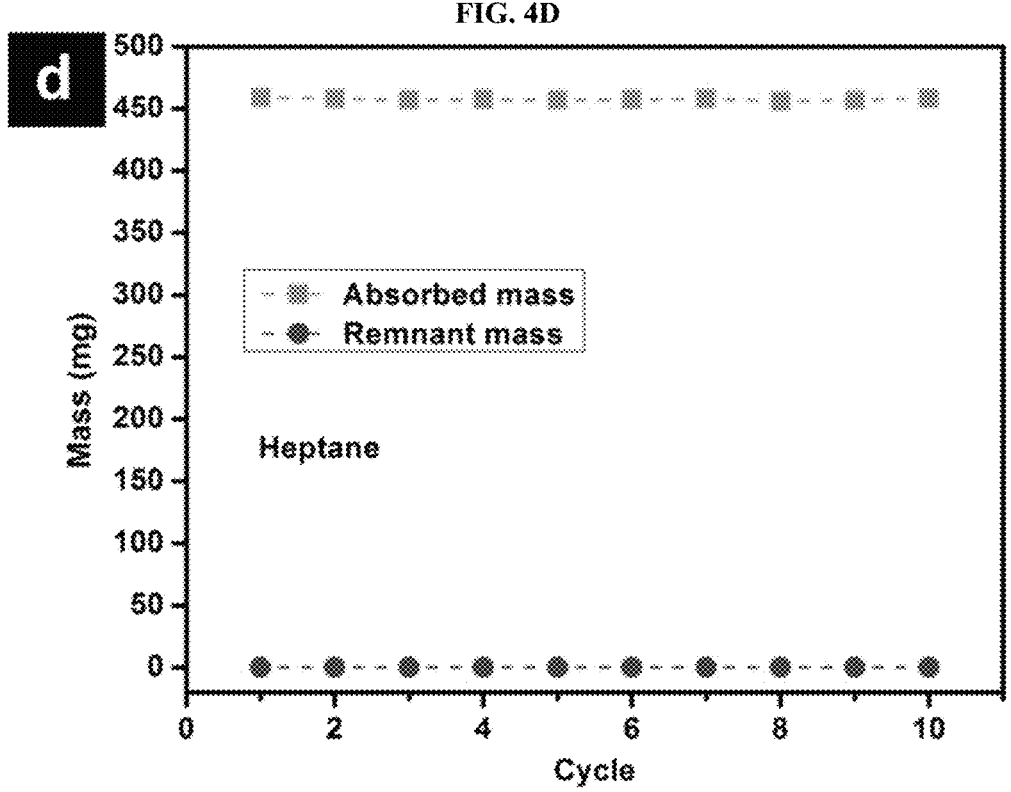

A simple, efficient, and low-cost heat treatment should be used for the removal of pollutants instead of solvent extraction treatment or combustion, which is complicated, inefficient, expensive, and wasteful. A recyclability test was performed using GMF1, heptane (boiling point, 98° C. to 99° C.). After the liquid was absorbed by GMF1, the material was heated to 95° C. to release heptane vapor. The temperature required for vaporization was controlled and maintained close to the boiling point of the absorbates. The residual mass in GMF1 was then weighed. This process was repeated 10 times to determine the feasibility and completeness of recycling organics from GMF1. Afterwards, GMF1 was regenerated. The results are shown in FIG. 4D. Less than 1% of residual weight remained in GMF1 after each cycle of heptane absorption-release. This result indicates highly stable recycling performance. The absorption ability of GMF1 essentially remained identical after 10 cycles of testing. The absorbed organics were released by simply heating the material and collecting the condensate. No physical damage to the GMF1 microstructure and nanostructure was observed. Chemical extraction or vacuum treatment, instead of heat treatment, is necessary for polymeric absorbents and expandable graphite composites that are sensitive to heat and these methods may result in incomplete recycling of pollutants, degradation of materials, and higher costs.

Example 4

Zeta Potential Measurements

Figure 6A:
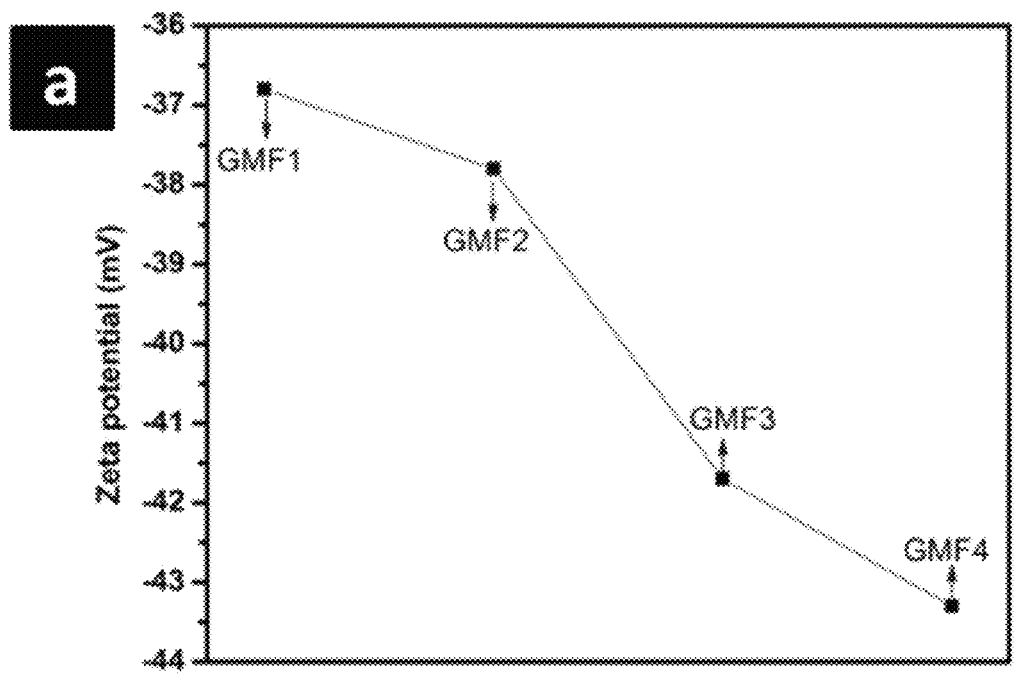
FIGS. 6A and 6B show zeta potential measurements for GMF1 to GMF4 and their dispersion, where

Zeta potential measures surface potential, hence charge density, on the surface of materials. Zeta potential measurements indicated that surface of the graphene/MoS$_2$ material is negatively charged. From the experiments carried out, it has been shown that surface of the GMFs were negatively charged, and surface potential become more negative as amount of MoS$_2$ precursors increased from GMF1 to GMF4, as shown in FIG. 6A.

Figure 6B:
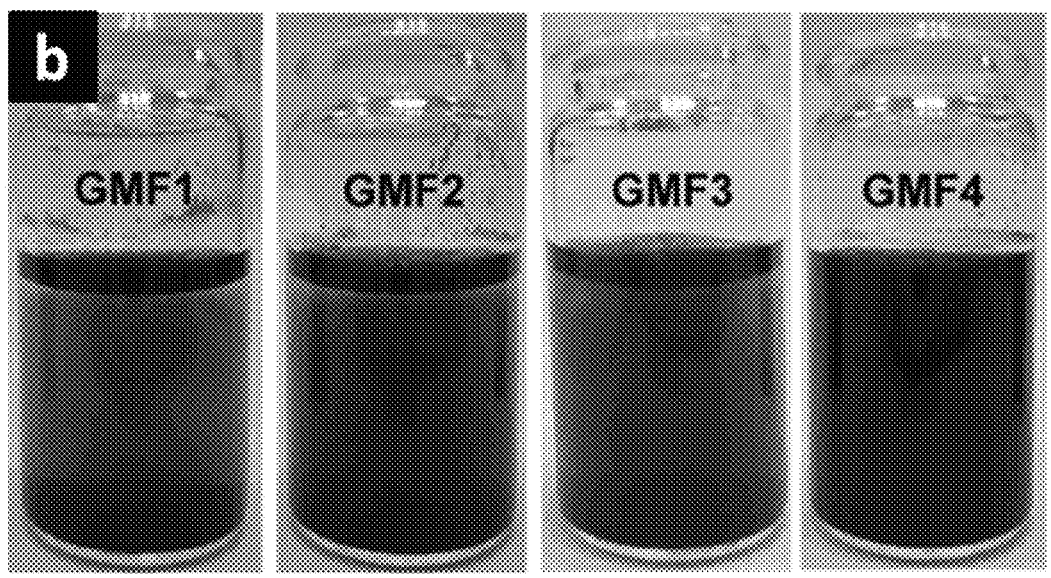

Effect of the surface potential may also be seen from dispersion of the GMF powders grinded from the aerogel (FIG. 6B), as magnitude of the zeta potential may indicate degree of electrostatic repulsion between adjacent, similarly charged particles in a dispersion. Generally, a high zeta potential confers stability, where the solution or dispersion may resist aggregation. Conversely, when the zeta potential is small, attractive forces may exceed this repulsion and the dispersion may break and flocculate.

For GMF1, the ashes within the dispersion aggregated together after some time. However, for GMF4, the sample ashes remained well dispersed, due to stronger electrostatic repulsion from the more negatively charged surface.

Advantageously, negative charges on MoS$_2$ promote electrostatic attraction of positively charged contaminants with itself, in this case heavy metal ions and some organic dyes. As such, the positively charged contaminants are attracted or pulled towards MoS$_2$ where the contaminants may be adsorbed onto the graphene/MoS$_2$ porous material, such that contaminated water is purified.

Example 5

Comparison in Performance of Graphene/Mos$_2$ Foam Compared to Graphene and MoS$_2$ Alone Pure graphene demonstrated an absorption capacity of less than 20 mg/g towards Pb$^{2+}$, while graphene/MoS$_2$ foam according to embodiments demonstrated an outstanding absorption capacity of more than 300 mg/g towards Pb$^{2+}$. Pure MoS$_2$ is unable to form 3D architectures without graphene. Instead, it forms a suspension upon mixing with water, thereby behaving as contaminates.

Example 6

Commercial Applications

The GMFs have potential applications in environmental protection, such as removal of oils, organic solvents. The high-yield, and easily scale-up method may satisfy the industrial requirement. Further, methods disclosed herein involve use of water as solvent, which render the process more environmentally friendly as compared to methods that involve use of acute toxic solvent and chemicals, such as hydrofluoric acid and hydrazine.

The GMFs has a bulk macroscopic porous network, which provides ease of handling when used for water purification. Due to its high porosity, the GMFs may be directly or indirectly (modified with nanomaterials) used as electrodes of energy storage devices such as supercapacitors, Li ion batteries, and water splitting.

The GMFs may also be used as the absorbent for removing the dyes and heavy metals.

The GMFs fabricated is fire resistant, so they may also be used as fireproof materials.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing a graphene-metal chalcogenide porous material, the method comprising
    a) providing a dispersion comprising graphene oxide;
    b) adding a metal precursor and a chalcogenide precursor to the dispersion to form a mixture;
    c) heating the mixture under hydrothermal conditions to form a gel; and
    d) freeze drying the gel to obtain the graphene-metal chalcogenide porous material,
    wherein a weight ratio of metal chalcogenide to graphene in the graphene-metal chalcogenide material is in the range of about 700 wt % to about 900 wt %.

2. The method according to claim 1, wherein the metal precursor is a precursor of a metal selected from Group 4 to Group 6 of the Periodic Table of Elements.

3. The method according to claim 1, wherein the metal precursor is a precursor of a metal selected from the group consisting of Mo, Ta, Ti, W, and combinations thereof.

4. The method according to claim 1, wherein the metal precursor is selected from the group consisting of a molybdate, a tantalate, a titanate, a tungstate, and combinations thereof.

5. The method according to claim 1, wherein the metal precursor comprises an alkali metal molybdate salt.

6. The method according to claim 1, wherein the metal precursor comprises sodium molybdate dehydrate.

7. The method according to claim 1, wherein the chalcogenide precursor is selected from the group consisting of a thioamide, a selenoamide, a tellurium amide, and combinations thereof.

8. The method according to claim 1, wherein the chalcogenide precursor comprises thioacetamide.

9. The method according to claim 1, wherein heating the mixture under hydrothermal conditions comprises heating the mixture in a closed vessel at a temperature in the range of about 150° C. to about 250° C.

10. The method according to claim 1, wherein heating the mixture under hydrothermal conditions comprises heating the mixture in a closed vessel for a time period in the range of about 12 h to about 48 h.

11. The method according to claim 1, wherein freeze drying the gel is carried out at a temperature in the range of about −50° C. to about 0° C.

12. The method according to claim 1, wherein freeze drying the gel is carried out for a time period in the range of about 24 h to about 56 h.

13. The method according to claim 1, wherein the metal chalcogenide comprises a metal dichalcogenide.

14. The method according to claim 1, wherein the metal chalcogenide is selected from the group consisting of MoS$_2$, MoSe$_2$, TaS$_2$, TiS$_2$, WS$_2$, and combinations thereof.

15. The method according to claim 1, wherein the metal chalcogenide is negatively charged.

16. The method according to claim 1, wherein adding the metal precursor and the chalcogenide precursor to the dispersion to form a mixture comprises adding at least one of metal particles or metal oxide particles to the dispersion.

17. The method according to claim 16, wherein the metal particles are selected from the group consisting of gold particles, silver particles, copper particles, and combinations thereof.

18. The method according to claim 16, wherein the metal oxide particles are selected from the group consisting of nickel oxide particles, manganese oxide particles, iron oxide particles, zinc oxide particles, and combinations thereof.

19. The method according to claim 1, wherein porosity of the graphene-metal chalcogenide porous material is in the range of about 99.5% to about 99.9%.

* * * * *